May 27, 1958      W. P. METEVIA      2,835,979
MICROMETER NUT AND BINDER RING ASSEMBLY
Filed Dec. 3, 1956
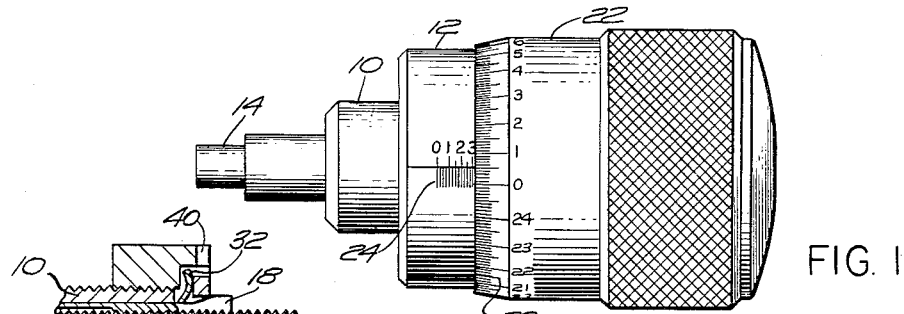
FIG. 1
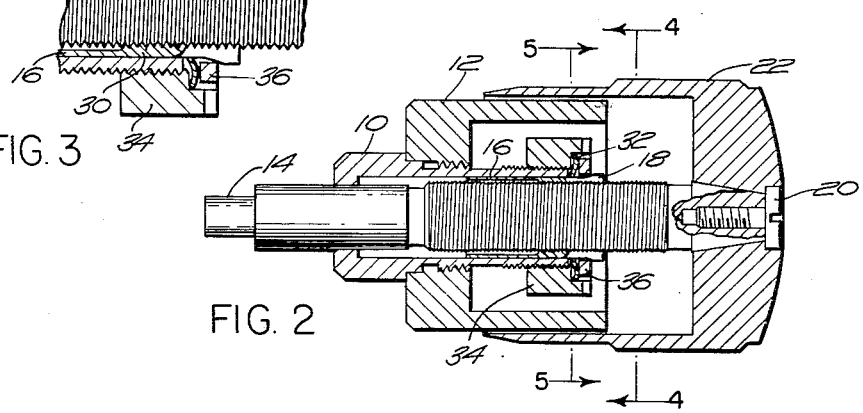
FIG. 3
FIG. 2
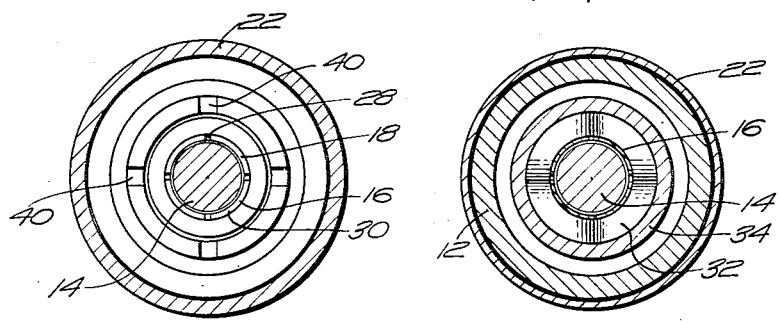
FIG. 4      FIG. 5
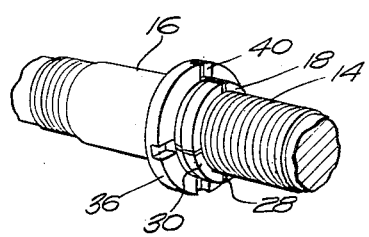
FIG. 6
*INVENTOR.*
WILLIAM P. METEVIA
BY
Kenway, Jenney, Witter & Hildreth
ATTORNEYS

United States Patent Office 2,835,979
Patented May 27, 1958

2,835,979
MICROMETER NUT AND BINDER RING ASSEMBLY

William P. Metevia, Athol, Mass., assignor to The L. S. Starrett Company, Athol, Mass., a corporation of Massachusetts Application December 3, 1956, Serial No. 625,789

3 Claims. (Cl. 33—164)

This invention relates to an improved assembly for maintaining the spindle engaging nut of a micrometer in uniform and constant resilient pressure engagement with the threads of the spindle throughout its full threaded portion. While micrometer spindles are extremely true and accurate, small infinitesimal variations in diameter and thread form do occur and, while such variations would cause little if any error in measurement, they do have a bearing on the smooth and true running of the spindle in the micrometer nut due to the very close fit of these two parts. The primary object of my invention resides in the production of an improved assembly for effecting and maintaining an improved cooperation of these parts.

The invention more particularly embodies a novel assembly for holding the spindle nut in predetermined resilient engagement with the spindle threads in lieu of a permanent setting assembly engagement as heretofore employed. Such improved construction employs a resilient annulus backed up by an adjusting nut for giving and maintaining a predetermined constant and uniform pressure of the spindle nut on the spindle threads, thereby effecting smooth and accurate running of the spindle throughout its threaded length in the nut and automatically taking up any irregularity that might cause play or backlash between these parts. The production of a novel assembly of this nature comprises a further object of the invention.

These and other features of the invention will be best understood and appreciated from the following description of a preferred embodiment thereof selected for purposes of illustration and shown in the accompanying drawing in which—

Fig. 1 is an elevation of a micrometer head embodying the invention,

Fig. 2 is a longitudinal sectional view therethrough,

Fig. 3 is an enlarged fragmentary portion of Fig. 2,

Fig. 4 is a sectional view taken on line 4—4 of Fig. 2,

Fig. 5 is a sectional view taken on line 5—5 of Fig. 2, and

Fig. 6 is a fragmentary perspective view of the spindle and nut assembly.

In the drawing 10 indicates the tubular body of a micrometer threaded coaxially into and secured to an inner shell 12. A spindle 14 extending axially through the body has a portion in threaded engagement with a nut 16 fitted tightly within the body and extending outwardly thereof at 18. The rear end of the spindle 14 extends into and is secured by a screw 20 to an outer shell 22. The inner and outer shells are graduated at 24 and 26 in the usual manner.

An end portion 18 of the spindle nut 16 is slotted radially at 28 to form a plurality of segments 30 in threaded engagement with the spindle. A corrugated spring washer 32 is mounted on the nut 16 between an adjusting nut 34 threaded to the body 10 and an annulus. The end portion 18 of the nut 16 tapers outwardly-rearwardly at 38 and the annulus 36 is in engagement therewith. The nut 34 is slotted at 40 to receive a wrench and it will be apparent that adjusting the nut rearwardly will engage the spring washer and force the annulus into contact with the tapered portion 38 of the nut 16. Such action compresses the segments 30 into threaded contact with the spindle and the degree of such compression can be predetermined by adjustment of the nut 34.

It will now be apparent that my novel assembly including the spring washer 32 backed up by the nut 34 holds the segments 30 of the nut 16 in predetermined resilient threaded engagement with the spindle. Thus the constant resilient pressure of the segments adapts them automatically and closely to engage and follow the spindle threads along their entire length and automatically to adapt the nut 16 to any slight irregularity of such threads. Such constant and resilient engagement of the nut 16 with the spindle threads furthermore automatically compensates for any slight irregularity in the diameter of the spindle and eliminates the possibility of backlash that might otherwise develop.

Having thus disclosed my invention what I claim as new and desire to secure by Letters Patent is:

1. In a micrometer, the combination of a tubular body, a threaded spindle disposed coaxially through the body, a tubular nut on the spindle carried coaxially within and by the body and having an end portion extending outwardly thereof, said end portion being slotted radially and embodying a plurality of segments in threaded engagement with the spindle, a portion of the segments tapering outwardly in one direction axially of the spindle, means including a spring resiliently compressible axially of the spindle disposed about and in contact with the tapering portion of the segments, and an adjusting nut threaded to said body and having an abutment face for engaging and compressing the spring in said one direction when the adjusting nut is rotated in one direction, the axial resiliency of the spring being adapted to function through said means and tapering portion of the segments to maintain the segments resiliently in uniform pressure engagement with the threads of the spindle.

2. The combination defined in claim 1 in which said means includes an annulus on and disposed to compress said segments when moved axially thereagainst in said one direction, the spring being disposed between the annulus and said abutment face of the adjusting nut and adapted resiliently to press the annulus in said one direction.

3. The combination defined in claim 2 in which the segments taper outwardly toward said end portion of the tubular nut.

References Cited in the file of this patent

UNITED STATES PATENTS

| 612,601 | Bellows | Oct. 18, 1898 |
| 1,326,598 | Jaques | Dec. 30, 1919 |
| 2,563,061 | Parker | Aug. 7, 1951 |

FOREIGN PATENTS

| 628,316 | Great Britain | Aug. 26, 1949 |